(12) United States Patent
Göthe et al.

(10) Patent No.: US 8,372,519 B2
(45) Date of Patent: Feb. 12, 2013

(54) COMPOSITION AND METHOD FOR TREATING WOOD

(75) Inventors: Sven Göthe, Bromma (SE); Ove Lindström, Skinnskatteberg (SE); Kristian Lough-Grimsgaard, Oslo (NO); Eric Sjöberg, Göteborg (SE)

(73) Assignee: Calignum Technologies AB, Tibro (SE)

( * ) Notice: Subject to any disclaimer, the term of this patent is extended or adjusted under 35 U.S.C. 154(b) by 621 days.

(21) Appl. No.: 12/434,724

(22) Filed: May 4, 2009

(65) Prior Publication Data

US 2009/0280344 A1 Nov. 12, 2009

Related U.S. Application Data

(63) Continuation-in-part of application No. PCT/SE2008/050518, filed on May 6, 2008.

(51) Int. Cl.
*B32B 23/04* (2006.01)
(52) U.S. Cl. .................... 428/532; 428/536; 428/537.1; 522/18
(58) Field of Classification Search ............... 428/537.1, 428/532, 536; 522/18
See application file for complete search history.

(56) References Cited

U.S. PATENT DOCUMENTS

| | | | | |
|---|---|---|---|---|
| 5,876,805 | A | * | 3/1999 | Ostlie ........................... 427/519 |
| 2003/0225178 | A1 | | 12/2003 | Purvis |
| 2007/0011951 | A1 | * | 1/2007 | Gaeta et al. ..................... 51/297 |

FOREIGN PATENT DOCUMENTS

| | | | |
|---|---|---|---|
| DE | 41 28 932 | | 3/1993 |
| EP | 0 293 556 | | 12/1988 |
| WO | 2006055409 | | 5/2006 |
| WO | WO2006055409 | * | 5/2006 |
| WO | 2007/079541 | | 7/2007 |
| WO | WO2007079541 | * | 7/2007 |

OTHER PUBLICATIONS

Hoyle, C.E. "Thiol-enes: Chemistry of the past . . . " JOPS Part A, 2004, vol. 42, No. 21, pp. 5301-5338.*
Hoyle et al., "Thiol-Enes: Chemistry of the Past with Promise for the Future", Journal of Polymer Science: Part A: Polymer Chemistry, vol. 42, 2004, pp. 5301-5338.
STN International, File CAPLUS, CAPLUS Accession No. 1984: 474620, Document No. 101:74620, Kuraray Col., Ltd.: "Durable wood materials", and JP 59-70503, A, dated Apr. 21, 1984.
International Search Report corresponding to PCT/SE2008/050518 mailed Jan. 15, 2009.
Written Opinion corresponding to PCT/SE2008/050518 mailed Jan. 15, 2009.

* cited by examiner

*Primary Examiner* — Leszek Kiliman
(74) *Attorney, Agent, or Firm* — Renner, Otto, Boisselle & Sklar, LLP

(57) ABSTRACT

The present invention relates to a composition in the form of a mixture comprising at least two components a) and b), wherein component a) comprises at least one mono and/or multifunctional thiol and component b) comprises at least one mono and/or multifunctional ene, wherein the molar ratio between the thiol groups and the ene groups is 1:0.1 to 1:100. Further, the invention relates to an impregnated wood element, wherein it is obtainable by impregnating a wood element with a composition according to the present invention or a mixture of the components of the composition in batch form (multi-component) according to the present invention and thereafter curing the composition or the mixture. The invention also relates to a method of impregnating a wood element.

6 Claims, No Drawings

COMPOSITION AND METHOD FOR TREATING WOOD

This application claims the benefit of and is a continuation-in-part of International Application No. PCT/SE2008/050518 filed May 6, 2008.

TECHNICAL FIELD

The present invention relates to a composition in the form of a mixture comprising at least two components a) and b), wherein component a) comprises at least one mono and/or multifunctional thiol and component b) comprises at least one mono and/or multifunctional ene, a composition in batch form comprising at least two components a) and b), wherein the component a) comprises at least one mono and/or multifunctional thiol and component b) comprises at least one mono and/or multifunctional ene, and finally, an impregnated wood element obtainable by impregnation of a wood element with the composition and a method of impregnation.

BACKGROUND

Thiol-ene free radical chemistry is known from early works that are dated back to late 1930s. A review "Thiol-Enes: Chemistry of the Past with Promise for the Future" is written by Charles E. Hoyle, Tai Yeon Lee, Todd Roper in J. Polym. Sci. Part A: Polym. Chem.: Vol. 42 (2004). Thiolenes have been used in the following fields: clear protective coatings, pigmented coatings, photoinitiated liquid crystalline structural materials and adhesives.

Impregnation/modification of wood is described in many applications and patents. The main objective in these applications has been to prevent the wood from degradation and fungi by improving the water resistance. Focus for the last years has been to replace old impregnation methods with new, environmental friendly techniques. Several promising techniques are based on treating wood with furfuryl (WPT/Kebony), acetyl (Accoya/Accsys/Titanwood), phenol (Fibron, C-K composites, Permali etc) or urea/melanin/formaldehyde resin (BASF/Belmadur).

Water/aqueous based impregnation techniques depend largely on controlled swelling of the wood cells during an energy intensive process including high temperature and pressure over time. Several of the techniques show good performance with improved water resistance, but none have so far proved to be cost efficient. Common drawbacks are also limited penetration of the impregnation liquid, discolouring and to some extent swelling of the impregnated wood products.

Impregnation with organic oils like Tung and Linseed oil has historically been the preferred impregnation technique for wood. The oils depend on a slow air oxidation mechanism to cure properly. Penetration is limited, often resulting in an incomplete water resistance.

Wood is a preferred material for furniture productions. However, massive wood constructions have limited mechanical strength compared to materials like metal and various composite materials. Furniture designers are therefore forced to use other materials when thin constructions are required.

Further, rapid deforestation of tropical rain forest combined with a dramatic climate change have put focus on how to substitute dark coloured tropical wood in applications like flooring, furniture and boat decking. In several of the recent impregnation techniques mentioned earlier, the resulting wood is usually darkened and/or miscoloured. This side effect can be utilized in copying some tropical wood species by impregnating lighter/softer wood. This colouring is however hard to control with respect to exact copying the tropical appearance.

There is therefore a demand for improving the properties in wood products in several areas. Examples are water resistance, improved hardness, dimension stability, mechanical strength, stiffness and colourisation. Colourisation combined with increased mechanical strength will be a important area in the years to come. The objective will be to substitute rainforest wood in most applications to preserve a scarce and fragile resource.

SUMMARY OF THE INVENTION

The objective of the present invention is to provide an impregnated wood element with improved properties and performance in different applications, such as water resistance, hardness, dimension stability, mechanical strength, stiffness, high E module and colouration. This is achieved with a composition which is used for impregnating wood elements.

Thus, the present invention relates to a composition in the form of a mixture comprising at least two components a) and b), wherein component a) comprises at least one mono and/or multifunctional thiol and component b) comprises at least one mono and/or multifunctional ene, wherein the molar ratio between the thiol groups and the ene groups is 1:0.1 to 1:100.

Further, the present invention relates to a composition in batch form (multi-component form) comprising at least two components a) and b), wherein the component a) comprises at least one mono and/or multifunctional thiol and component b) comprises at least one mono and/or multifunctional ene, wherein the molar ratio between the thiol groups and the ene groups is 1:0.1 to 1:100, and the components a) and b) are separated from each other.

In addition, an impregnated wood element obtainable by impregnating a wood element with a composition in the form of a mixture according to the present invention or a mixture of the components of the composition in batch form (multi-component form) according to the present invention, and thereafter curing the composition or the mixture is also included in the invention.

Moreover, the present invention relates to a method of impregnating wood, wherein the wood element is impregnated with the composition in the form of a mixture according to the present invention or a mixture of the components of the composition in batch form (multi-component form) according to the present invention.

Furthermore, the use of a composition in the form of a mixture or a mixture of the components of the composition in batch form for impregnating wood elements is also concerned.

DEFINITIONS

By "thiol" is meant a compound that contains the functional group composed of a sulphur atom and a hydrogen atom, i.e. a —SH group. This functional group is referred to as either a thiol group or a sulphydryl group. Thiols are also referred to as mercaptans.

By "ene" is meant a compound that contains at least one functional group composed of an unsaturation that is a double bond or a triple bond between two carbon atoms. This functional group is referred to as an ene group.

"Mono functional" means one molecule having one functional group. When relating to thiols, it would mean a thiol molecule having one thiol group. The same is valid for enes, i.e. the molecule has one unsaturation.

"Multi functional" means one molecule having two or more functional groups. When relating to thiols, it would mean a thiol molecule having two or more thiol groups. The same is valid for enes, i.e. the molecule has two or more unsaturations.

"Thiol-enes" is the expression for a solution comprising compounds having thiol groups and compounds having ene groups. This expression may be used sometimes for the composition comprising the two components a) and b). But it can only be used when the components a) and b) are in mixture.

The expression "composition in batch form" (multi-component form) is used in the application. By "batch form" is meant that for example at least two components are comprised in the composition and they are held separate from each other. They can be separated by being kept in two separate vessels or in a vessel having a partition wall, which can be withdrawn or broken later on, when the composition is to be used. The separation may be used, for two components that would react when not desired, for example when two components react before it is applied in the impregnation process. This depends on which components which are chosen and what storage time is desired.

The expression "composition in the form of a mixture" is used when the at least two components are in mixture in the composition.

A wood element may be any piece or part of a wood, compressed or uncompressed, of hardwood, softwood or any type of wood species.

DETAILED DESCRIPTION OF THE INVENTION

The present invention relates to a composition in the form of a mixture comprising at least two components a) and b), wherein component a) comprises at least one mono and/or multifunctional thiol and component b) comprises at least one mono and/or multifunctional ene, wherein the molar ratio between the thiol groups and the ene groups is from 1:0.1 to 1:100. The different molar ratios between thiol and ene enables the operator to control the curing process and tailor make the impregnated wood element properties. Another effective conversion of the reactive thiol groups and ene groups is achieved for molar ratios of thiol and ene ranging from 1:0.9 to 1:10. At low ratios the thiol is to a large extent acting as an initiator and chain transfer agent, at higher ratios the thiol is to a larger extent acting as a co-monomer. The composition is used for impregnating wood. Very good penetration is achieved by using an ordinary vacuum-pressure impregnation autoclave. Curing is achieved at 60-150 degrees C. adding any ordinary heat source like a heat oven, a wood drying kiln/chamber, a HF/warm press etc. The resulting wood element will have significantly increased mechanical properties. Nordic hard wood species like alder, beech and birch will after impregnation all have hardness in the range 8-15 Brinell depending on the initial wood texture (annual ring orientation, knots, initial hardness etc). Tests of bending strength show increased values up to 70% for the same species. For example the bending strength for birch increased from 115 MPa to 160 MPa and for compressed birch the bending strength increased from 141 MPa to 239 MPa (see table 8, Example 9).

Further, the invention relates to a composition in batch form comprising at least two components a) and b), wherein the component a) comprises at least one mono and/or multifunctional thiol and component b) comprises at least one mono and/or multifunctional ene, wherein the molar ratio between the thiol groups and the ene groups is 1:0.1 to 1:100, and the components a) and b) are separated from each other. As mentioned above, the components sometimes need to be separated, since the thiol groups and the ene groups may react with each other before it is desired. Some of the mixtures of the components a) and b) react very quickly, while other mixtures of two components a) and b) may not react that fast. Such a mixture or composition has a longer pot life. It should be understood that a mixture of the two components a) and b) in the composition of the batch form is the equivalence to the composition in the form of a mixture comprising the two components a) and b).

As disclosed above, another effective conversion of the reactive thiol groups and ene groups is achieved for molar ratios of thiol and ene ranging from 1:0.9 to 1:10. A regular and controllable polymer network can be obtained by the narrower range. The degree of curing may also be improved.

In the following when using the expression "composition", it relates to both composition in the form of a mixture and composition in batch form if not other specified.

As mentioned, the properties of wood elements are improved by impregnating with the composition according to the present invention. Compositions with thiol groups and ene groups are earlier known, and are often referred to as "thiol-enes" as mentioned above. The use area for thiol-enes has been clear protective coatings, pigmented coatings, photo-initiated liquid crystalline structural materials and adhesives. It has now surprisingly been found by the inventors that the composition, according to the present invention, comprises at least two components a) and b), wherein component a) comprises at least one mono and/or multifunctional thiol and component b) comprises at least one mono and/or multifunctional ene, wherein the molar ratio between the thiol groups and the ene groups is 1:0.1 to 1:100 is possible to use for impregnation of wood elements and give wood elements with very good properties. Besides, the area of application of wood may be increased. The molar ratio between the thiol groups and the ene groups may also be 1:0.9 to 1.10.

The composition in the form of a mixture comprising a component comprising at least one mono and/or multifunctional thiol group and a component comprising at least one mono and/or multifunctional ene group according to the present invention can be cured through a free radical mechanism (see scheme 1 below) at room temperature.

Scheme 1. General thiol-ene polymerisation process.

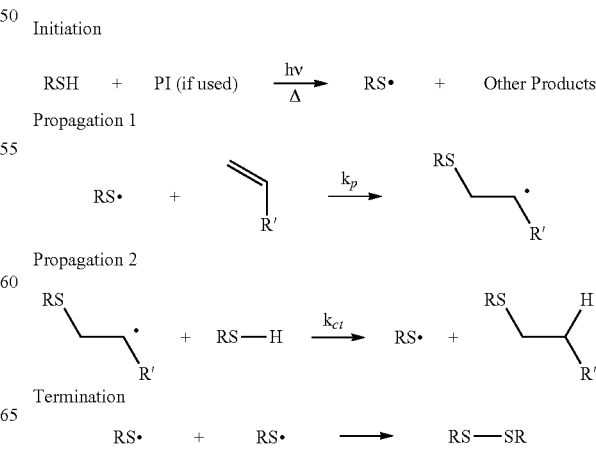

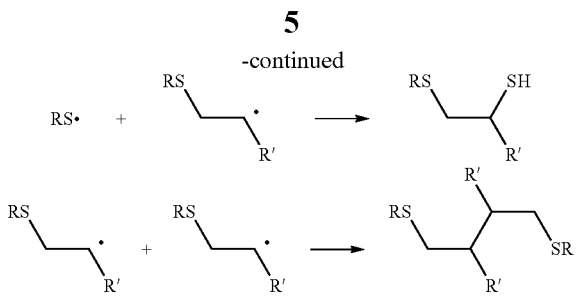

Scheme 1. General thiol-ene photopolymerization process.
PI = Initiator, hv = UV energy (ultra-violet), Δ = heat energy The overall conversion rate of the thiol-ene reaction is directly related to the electron density on the ene, with an electron rich ene consumed much more quickly than electron poor enes. The basic exception to this rule is that highly conjugated double bonds copolymerise very slowly with thiols. The ordering of reactivity for different enes with thiols is shown in Scheme 2 below. Thiols based on mercaptopropionate esters co-polymerise with a given ene more quickly than mercaptoacetate esters, which in turn react more quickly than simple alkyl thiols.

Scheme 2. Reactivity Towards Thiols for Different Enes.

Norbornene>Vinyl ether>Propenyl>Alkene~Vinyl ester>N-Vinyl amide>Allyl ether~Allyltriazine>Allylisocyanurate>Acrylate>Unsaturated esters>N-substituted meleimide>Acrylonitrile~Methacrylate>Styrene>Conjugated dienes.

A composition in the form of a mixture according to the present invention can thus be controlled by selecting different thiol and ene combinations or use inhibitors or free radical initiators. If the reaction is starting too quickly, it may be necessary to use the composition in batch form (multi-component form) and provide a mixture when impregnating wood elements. A batch form can provide the different components in different vessels or in a vessel comprising at least two compartments. When the composition shall be mixed, the content from different vessels is mixed or the content of different compartments of a vessel will be mixed. A separation wall between different compartments may be broken or the components can be mixed in a separate vessel. If the components do not react very quickly, there is no problem having the components in one vessel. However, it may be useful to add a free radical initiator if the reaction needs to be started when for example it is to slow. Further, an inhibitor can be used instead of using different vessels or a partition into different compartments for the components. The reaction between the components will then be inhibited when it is desired.

The thiols can be selected from the group consisting of mercaptopropionate esters, mercaptoacetate esters and mixtures thereof. These thiols are suitable because they give a pot life and curing process that can be controlled. Also, the properties of the impregnation can be tailor-made.

The enes may be chosen from the group consisting of norbornene, vinyl ether, propenyl, alkene, vinyl ester, N-vinyl amides, allyl ethers, allyltriazine, allylisocyanurate, acrylate, unsaturated esters, N-substituted meleimide, acrylonitrile, methacrylate, styrene, conjugated dienes and mixtures thereof. These enes are suitable since they give a pot life and curing process that can be controlled. The properties of the impregnation can of course also be tailor-made.

The invention also relates to a composition in batch form comprising at least two components a) and b), wherein the component a) comprises at least one mono and/or multifunctional thiol selected from the group consisting of mercaptopropionate esters, mercaptoacetate esters and mixtures thereof, and component b) comprises at least one mono and/or multifunctional ene chosen from the group consisting of norbornene, vinyl ether, propenyl, alkene, vinyl ester, N-vinyl amides, allyl ethers, allyltriazine, allylisocyanurate, acrylate, unsaturated esters, N-substituted meleimide, acrylonitrile, methacrylate, styrene, conjugated dienes and mixtures thereof, the molar ratio between the thiol groups and the ene groups is 1:0.1 to 1:100; and the components a) and b) are separated from each other.

Further, at least one of the components a) and b) may comprise dyes, micronised pigments and/or pigments. The dyes will be preferred due to its small size and high penetration giving a controllable colouring process.

At least one of the components a) and b) may comprise additives selected from initiators, inhibitors, and other additives. Initiators and inhibitors can control the reaction. The initiators can be activated by for example heat (IR, convection, microwave), photo (UV/Visible) or radiation (EB, gamma or beta).

The present invention also relates to an impregnated wood element, wherein it is obtainable by impregnating a wood element with a composition in the form of a mixture or a mixture of the components of the composition in batch form, and thereafter curing the composition or the mixture. It has been explained above, that the mixture of the components of the composition in batch form as defined above is the equivalence of the composition in the form of a mixture as defined above.

The present invention thus relates to an impregnated wood element, which is obtainable by impregnating a wood element with a composition in the form of a mixture comprising at least two components a) and b), wherein component a) comprises at least one mono and/or multifunctional thiol selected from the group consisting of mercaptopropionate esters, mercaptoacetate esters and mixtures thereof, and component b) comprises at least one mono and/or multifunctional ene chosen from the group consisting of norbornene, vinyl ether, propenyl, alkene, vinyl ester, N-vinyl amides, allyl ethers, allyltriazine, allylisocyanurate, acrylate, unsaturated esters, N-substituted meleimide, acrylonitrile, methacrylate, styrene, conjugated dienes and mixtures thereof, the molar ratio between the thiol groups and the ene groups is 1:0.1 to 1:100; and thereafter curing the composition or the mixture.

The composition for the impregnation method may have all properties disclosed above. The impregnated wood element may be a compressed wood element.

The impregnated wood element achieves excellent properties when impregnated with the composition or the mixture according to the present invention. Several tests have been executed by the independent technological institute SWEREA IVF of Gothenburg. Hardness tests were preformed on several hard species. The results are shown in Example 8.

The test shows that ordinary hard wood achieves significantly increased mechanical properties with respect to hardness that increases up to 600%, and bending strength that increases up to 70%. For example, the hardness for alder increased from 2.1 Brinell to 15-2 Brinell and for birch the hardness increased from 2.6 Brinell to 14.9 Brinell. The bending strength for birch increased from 115 MPa to 160 MPa and for alder the bending strength increased from 90 MPa to 121 MPa. The compressed (according to the Calignum patent EP 0729401 B1) impregnated wood samples achieves up 300% increase in hardness and up to 150% increase in bending strengths. For example the hardness for compressed beech increased from 7.2 Brinell to 11.7 Brinell and for compressed birch increased from 4.5 Brinell to 11.9 Brinell. The bending strength for compressed birch increased from 141 MPa to 239 MPa and for compressed beech increased from 175 MPa to 202 MPa. These values are not limiting the present invention. Alternative uses of different kinds of wood and compressed wood combined with different compositions according to the present invention can obtain higher values.

All wood elements impregnated according to this patent can be processed (sanding, flattening, sawing etc) similar to extra hard natural wood. This means that the wood elements can be processed in any wood tool or machinery. However, as the impregnated wood now is very hard, the tools need to be sharpened/maintained accordingly.

The impregnated wood will also have increased dimension stability and water resistance.

The impregnated wood element may comprise from about 1 to about 80% by weight of the composition or the mixture calculated on the total weight of the impregnated wood element. This is a wide interval for the amount of composition that may be taken up of the wood. A low amount may be useful for only giving an already hard and mechanically good wood element a nice colour, an improved protection for water, while the wood may already have a quite good resistance to water. Further, a very porous wood type may take up about 80% by weight of the composition. This might be necessary for getting the desired properties of such a wood element. If the wood element is porous, it needs to be strengthened by the composition. It also may need an increased water resistance in this extent obtainable by the high amount of composition. The amount of the composition or the mixture which is taken up by the wood element depends on the selected wood and the composition. Further, it is regulated by the method, which is described below.

The method of impregnating a wood element may also comprise a step of subjecting the wood element for some kind of compression. The compression may be performed before or after the impregnation step. For example, the wood element can be subjected to compression in any direction of the wood element.

There are further ways of compressing wood elements. An example of compressing wood elements is disclosed in EP 0729401B1. This method uses isostatic compression. The wood is referred to as compressed wooden elements since the wood obtained is very hard. We refer to the EP document, regarding the method of producing such a wood element. Such a wood element impregnated with the composition according to the present invention will be extremely hard and will have a high mechanical strength. The compression step may be performed before or after the impregnation of the wood element.

The wood element can be selected from the group consisting of soft wood and hard wood. Both kinds of wood will work. Examples of soft wood are pine and spruce. Hard wood may be birch, alder, aspen, beech or oak.

The wood element are ideal for most indoor wood products like flooring, stairs and furniture that utilize a hard, beautiful surface with a high degree of resistance to wear and tear. Generally all indoor wood constructions will benefit from the increased mechanical properties like bending strength. The increased water resistance combined with the increased strength makes it a good material for out door use, such as wood for building constructions, outdoor furniture etc.

The present invention also relates to a method of impregnating wood, wherein the wood is impregnated with a composition in the form of a mixture according to the present invention or a mixture of the components of the composition in batch form (multi-component form) according to the present invention.

The present invention then may relate to a method of impregnating a wood element, wherein the wood element is impregnated with a composition in the form of a mixture comprising at least two components a) and b), wherein component a) comprises at least one mono and/or multifunctional thiol selected from the group consisting of mercaptopropionate esters, mercaptoacetate esters and mixtures thereof, and component b) comprises at least one mono and/or multifunctional ene chosen from the group consisting of norbornene, vinyl ether, propenyl, alkene, vinyl ester, N-vinyl amides, allyl ethers, allyltriazine, allylisocyanurate, acrylate, unsaturated esters, N-substituted meleimide, acrylonitrile, methacrylate, styrene, conjugated dienes and mixtures thereof, the molar ratio between the thiol groups and the ene groups is 1:0.1 to 1:100.

Further, the present invention may relate to a method of impregnating a wood element, wherein the wood element is impregnated with a mixture of a composition in batch form comprising at least two components a) and b), wherein component a) comprises at least one mono and/or multifunctional thiol selected from the group consisting of mercaptopropionate esters, mercaptoacetate esters and mixtures thereof, and component b) comprises at least one mono and/or multifunctional ene chosen from the group consisting of norbornene, vinyl ether, propenyl, alkene, vinyl ester, N-vinyl amides, allyl ethers, allyltriazine, allylisocyanurate, acrylate, unsaturated esters, N-substituted meleimide, acrylonitrile, methacrylate, styrene, conjugated dienes and mixtures thereof, the molar ratio between the thiol groups and the ene groups is 1:0.1 to 1:100; wherein the components a) and b) are separate from each other in the batch form before impregnating and mixed with each other to a mixture of components a) and b) when impregnating.

The components a) and b) may be mixed just before the impregnation.

Those methods then differ in that the composition in the start of the latter method is in a batch composition, wherein the two components a) and b) are separate from each other. When the wood element is to be impregnated, the two components a) and b) are mixed with each other to a mixture. In the former method, the composition of the two components is a mixture already at the beginning of the method. When the batch composition is used, the components usually react faster with each other and have a shorter pot life.

Impregnation of wood is easily understood by a person well known in the art. Impregnation generally involves the steps of applying vacuum and pressure in an autoclave to achieve penetration of the impregnation liquid into the wood product. The impregnated wood is then typically cured through the use of heat to accomplish polymerization of the impregnation fluid (within the wood cell structures). Even though the method is commonly known, some examples of how to achieve the impregnation is described below.

The wood element may be impregnated using the steps i, ii, iii, vii, viii and optionally one or more of the steps iv, v and vi in an arbitrary order.
  i) charge the wood element in a chamber
  ii) feed the composition or the mixture into the chamber,
  iii) subject the wood element in the chamber to vacuum,
  iv) subject the wood element to normal pressure,
  v) subject the wood element to over pressure,
  vi) subject the wood element to vacuum,
  vii) remove the wood element from the chamber, and viii) heat the impregnated wood element to a temperature of at least 40° C. for at least 5 minutes.

The composition or the mixture can also be fed, under vacuum, into the chamber as an alternative process step. The wood element is than charged alone into the chamber before vacuum is applied. The other process steps are the same and can be applied in arbitrary order.

The steps may be done in any suitable order. Thus, they are not necessary performed in the order disclosed above. Further, some of the steps may be performed twice or more. These methods are commonly used methods in impregnating wood elements.

The step viii), which is the curing or heating step, is starting the curing of the composition. The curing can be performed at a temperature from room temperature up to about 180° C. However, even higher temperatures can be used and this is dependent on the wood substrate and thiolene composition. The heating and curing time depend on which components a) and b) that are used and on the temperature. Curing at room temperature makes it necessary to use a longer time for the curing.

The amount of composition which can be taken up by the wood element can be adjusted by the different steps in the method. A lower vacuum may prepare the wood for an easy take up of composition and a high over pressure may force the composition into the wood element. The duration of different steps may also influence the amount of composition which is taken up by the wood element.

Further, the present invention relates to the use of a composition in the form of a mixture according to the present invention as disclosed above or a mixture of the components of the composition in batch form according to the present invention as disclosed above for impregnating a wood element.

The invention especially relates to the use of a composition in the form of a mixture comprising at least two components a) and b); or a mixture of at least two components a) and b) of a composition in batch form, wherein the components a) and b) are separated from each other before use; wherein component a) comprises at least one mono and/or multifunctional thiol selected from the group consisting of mercaptopropionate esters, mercaptoacetate esters and mixtures thereof, and component b) comprises at least one mono and/or multifunctional ene chosen from the group consisting of norbornene, vinyl ether, propenyl, alkene, vinyl ester, N-vinyl amides, allyl ethers, allyltriazine, allylisocyanurate, acrylate, unsaturated esters, N-substituted meleimide, acrylonitrile, methacrylate, styrene, conjugated dienes and mixtures thereof, the molar ratio between the thiol groups and the ene groups is 1:0.1 to 1:100.

Hereby follow Examples for further illustrating, but not limiting, the present invention.

EXAMPLES

1. Example of Reactivity of Different Thiols and Enes 1a) 10 gram samples of compositions of the thiol TMPMP and different enes in molar ratio 1:1 between the thiol groups and the ene groups where tested and different speeds of the reaction were noted. The compositions were placed in vessels. The temperature was first at RT (room temperature, 20° C.) up to 20 minutes, thereafter at 78° C. up to 25 minutes and finally at 100° C. until the reaction was completed (curing). Sometimes it was not necessary to heat to the higher temperatures, since the composition was already cured (FTIR, conversion of double bonds>90%.

The results are shown in the table 1 below:

TABLE 1a

Different type of enes with the thiol TMPMP (Trimethylolpropane Tri-3-mercaptopropionate) in molar ratio 1:1:

| Type of ene | RT (min) | 78° C. (min) | 100° C. (min) | Pencil Hardness | FTIR (%) |
|---|---|---|---|---|---|
| TEGDMA Triethyleneglycol dimethacrylate | 20 | 12 | | Hard, Elastic | 96 |
| TMPTMA Trimethylolpropane trimethacrylate | 20 | 9 | | Hard | 93 |
| HDDMA Hexanediol dimethacrylate | 20 | 25 | 30 | Rubber | 91 |
| TMPTA Trimethylolpropane triacrylate | 20 | 6 | | Hard | 92 |
| HDDA Hexandiol diacrylate | 20 | 6 | | Hard, Elastic | 97 |
| TMPDA Trimethylolpropane diallylether | 20 | 25 | 30 | Elastic | 90 |
| HDDVE Hexandiol diviylether | 15 | | | Elastic | 91 |
| Norbonene | 10 | | | Elastic, viscous | 89 |
| DVB Divinylbenzene | 20 | 25 | 40 | Viscous | 86 |
| TO Tung Oil | 20 | 25 | 60 | Not cured | 68 |

FTIR measures the conversion of double bonds in %. Hardness is measured by pressure of a pen towards the surface and bending the specimen.

The results above show the difference in reactivity dependent on the type of ene (unsaturation) used. Increased functionality of ene groups on the same molecule increases reaction speed.

1b) 10 gram samples of compositions of different thiols and the ene TMPTA in molar ratio 1:1 between the thiol groups and the ene groups where tested and different speeds of the reaction were noted. The compositions were placed in vessels. The temperature was at 80° C. until the reaction was completed (curing means>90% conversion of double bonds measured by FTIR).

TABLE 1b

Different type of thiols with the TMPTA (Trimethylolpropane Triacrylate) in molar ratio 1:1:

| Type of Thiol | 80° C. (min) | Pencil Hardness | FTIR (%) |
|---|---|---|---|
| TMPMP Trimethylolpropane Tri-3-mercaptopropionate | 7 | Hard with flexibility | 96 |
| PETMP Pentaerythritol Tetra-mercaptopropionate | 3 | Hard with flexibility | 94 |
| PETMA Pentaerythritol Tetra-mercaptoacetate | 6 | Hard with flexibility | 94 |

The results in table 1b show that increased functionality of thiol groups on the same molecule increases reaction speed. It is also shown that mercaptopropionate thiols are more reactive compared to mercaptoacetate thiols.

2. Example of Different Molar Ratio Thiol/Ene Groups 10 gram samples of compositions of the thiol TMPMP (Trimethylol-propane Tri-3-mercaptopropionate) and the ene TMPTA (Trimethylolpropane Triacrylate) in different molar ratios were prepared to study the resulting hardness and surface properties. The curing conditions were 80° C. for 6 minutes. See table 2a.

TABLE 2a

Curing at 80° C. for 6 minutes for different molar ratio between thiol (TMPMP = Trimethylolpropane Tri-3-mercaptopropionate) and ene (TMPTA (Trimethylolpropane Triacrylate).

| Thiol | Ene | Molar ratio between thiol and ene groups | Comments |
|---|---|---|---|
| TMPMP | TMPTA | 1:1 | Hard Flex, Rough surface |
| TMPMP | TMPTA | 1:1.3 | Hard with some Flex Harder than 1:1 Rough surface |
| TMPMP | TMPTA | 1:2.3 | Hard with some Flex Harder than 1:1.3 Rough surface |
| TMPMP | TMPTA | 1:3.6 | Hard Harder than 1:2.3 Dry, smooth surface |
| TMPMP | TMPTA | 1:6.5 | Very hard Harder than 1:3.6 Dry, smooth surface |

The results above indicate that different molar ratios between thiol and ene functionality give products with different properties. Increased ene functionality gives in the combination of TMPMP and TMPTA increased hardness. Different combinations of thiols and enes give different mechanical properties dependent on their molar ratio and functionality. The composition PETMP (Pentaerythritol Tetra-mercaptopropionate) and TEGDA (Triethyleneglycol Diacrylate) gives harder films with increased molar ratio for PETMP (see table 2b).

TABLE 2b

Curing at 80° C. for 6 minutes for different molar ratio between thiol (Pentaerythritol Tetra-mercaptopropionate) and TEGDA (Triethyleneglycol Diacrylate).

| Thiol | Ene | Molar ratio between thiol and ene groups | Comments |
|---|---|---|---|
| PETMP | TEGDA | 1:0.7 | Hard |
| PETMP | TEGDA | 1:1 | Hard with some Flex |
| PETMP | TEGDA | 1:2.3 | Flex with some Hardness |

3. Example of Different Curing Temperatures

The effect of different curing temperatures was investigated with a composition of the thiol TMPMP (Trimethylolpropane Tri-3-mercaptopropionate) and the ene TMPTA (Trimethylolpropane Triacrylate). The molar ratio was 1:1 between the thiol and ene groups.

Wooden pieces of compressed alder (50×150×4 mm) were impregnated with the composition above. The impregnation process parameters were the following:
Vacuum pressure: 0.2 bar during 4 minutes
Normal pressure: 6 minutes
Over pressure: 2 bar during 10 minutes
Normal pressure: 2 hours Curing was performed in a convection oven at different temperatures and times. See table 3a and 3b.

TABLE 3a

| Sample | Curing Condition (° C., hours) | Weight % of thiolene composition in wood elements | Pressure test (1-5) | Sanding test (1-5) | Water resistance (1-5) |
|---|---|---|---|---|---|
| 1 | 20, 72 | 31 | 5 | 2 | 4 |
| 2 | 100, 0.5 | 34 | 5 | 3 | 4 |
| 3 | 100, 48 | 32 | 5 | 4 | 4 |
| 4 | 125, 0.17 | 32 | 5 | 3 | 4 |

Note that the scale 1 to 5 means that 1 is bad and 5 is excellent. Pressure test is a test if any liquid can be squeezed out from the wood piece. Sanding test is performed in a sanding machine with 120 paper. Water resistance is measures as the degree of deformation/swelling when water is places on a sanded surface of 10 × 20 mm.

TABLE 3b

| Sample | Curing Condition (° C., hours) | Weight % of thiolene composition in wood elements | Pressure test (1-5) | Sanding test (1-5) | Water resistance (1-5) |
|---|---|---|---|---|---|
| 1 | 40, 72 | 32 | 5 | 2 | 4 |
| 2 | 60, 72 | 32 | 5 | 3 | 4 |
| 3 | 80, 72 | 33 | 5 | 4 | 5 |
| 4 | 110, 72 | 32 | 5 | 5 | 5 |

Note that the scale 1 to 5 means that 1 is bad and 5 is excellent. Pressure test is a test if any liquid can be squeezed out from the wood piece. Sanding test is performed in a sanding machine with 120 paper. Water resistance is measures as the degree of deformation when water is places on a sanded surface of 10 × 20 mm.

In table 3c is an additional example shown. The composition in the investigation was thiol TMPMP (Trimethylolpropane Tri-3-mercaptopropionate) and the ene TMPTMA (Trimethylolpropane Trimethacrylate). The molar ratio was 1:5.6 between the thiol and ene groups.

Wooden pieces of compressed alder (50×150×4 mm) were impregnated with the composition above. The impregnation process parameters were the following:
Vacuum pressure: 0.1 bar during 6 minutes
Normal pressure: 15 during minutes TABLE 3c

| Curing Condition 100° C. (hours) | Weight % of thiolene composition in wood elements | Surface appearance | Pressure test (1-5) |
|---|---|---|---|
| 3 | 31 | Dry | 1 |
| 7 | 27 | Dry | 4 |
| 15 | 29 | Dry | 4 |
| 36 | 29 | Dry | 4 |

Note that the scale 1 to 5 means that 1 is bad and 5 is excellent. Pressure test is a test to see if any liquid can be squeezed out from the wood piece Conclusions from the tests are that curing temperature and time is important. Generally is higher temperature increasing reaction speed and shorter curing times are achieved. The curing time has to be optimized for each composition of thiol and ene. Table 3a, 3b and 3c show this effect of curing temperature.

4. Example of Different Heat/UV Sources for Curing

Different curing conditions have been investigated. Curing with heat generated in convection oven, IR lamps and microwave oven have been evaluated. The influence of UV lamps has also been tested. The results are shown in table 4.

The composition in the investigation was thiol TMPMP (Trimethylol-propane Tri-3-mercaptopropionate) and the ene TMPTA (Trimethylolpropane Triacrylate). The molar ratio was 1:1.3 between the thiol and ene groups.

Wooden pieces of compressed alder (50×150×4 mm) were impregnated with the composition above. The impregnation process parameters were the following:
Vacuum pressure: 0.1 bar during 10 minutes
Normal pressure: during 2 minutes
Over pressure: 1.5 bar during 8 minutes
Normal pressure: during 4 hours

TABLE 4

Comparison of different curing conditions

| Sample | Curing Condition | Weight % of thiolene composition in wood elements | Pressure test (1-5) |
|---|---|---|---|
| 1 | UV (Hg lamps) | 33 | 1 (dry surface) |
| 2 | UV + IR | 35 | 4 |
| 3 | IR | 30 | 3 |
| 4 | 100° C., 6 hours | 34 | 5 |
| 5 | Microwave | 32 | 4 |

Note that the scale 1 to 5 means that 1 is bad and 5 is excellent. Pressure test is a test if any liquid can be squeezed out from the wood piece. It was added to the composition 1% Irgacure 2100 in the tests with UV lamps.

From above it can be concluded that UV only effect the surface layers of the wood piece and the combination between UV and IR gives good curing through the whole wood piece. Only IR gives a cure which needs further improvement. The curing in a microwave oven and convection oven (100° C., 6 hours) gives good curing conditions for the impregnated wood piece.

5. Example of Controlling Pot Life. Different Thiols/Enes, Inhibitors and/or Free Radical Initiators In the impregnation process is pot life of the composition important in view of the time for the different process steps and the possibilities to use the same composition repeated times in the process.

There are several ways of controlling the pot life of the composition. Some of these are:
Selection of the thiols and enes (type, functionality, molar ratio)
Use of inhibitors
Use of free radical initiators (UV and heat sensitive initiators, shorter pot life when activated)
Different vessels can be used for two components
In table 5 are some examples shown.

TABLE 5

Examples of controlling pot life of the thiolene compostion.

| Sample | Thiol/Ene | Type control | Pot life |
|---|---|---|---|
| 1 | PETMA/TMPTA, 1:1 | Functionality Compared with sample 1 | 35 minutes |
| 2 | TMPMP/TMPTA, 1:1 | Type thiol Compared with sample 1 | 16 timmar |
| 3 | TMPMP/TEGDA, 1:1 | Type ene Compared with sample 2 | 35 timmar |
| 4 | TMPMP/TEGDA, 1:2 | Molar ratio | 43 timmar |

TABLE 5-continued

Examples of controlling pot life of the thiolene compostion.

| Sample | Thiol/Ene | Type control | Pot life |
|---|---|---|---|
| 5 | TMPMP/TMPTA, 1:1 | Compared with sample 3 Hydrokinon Inhibitor | 17% longer pot life Compared to sample 2 |
| 6 | TMPMP/TMPTA, 1:1 | Besoyl peroxide Free radical initiator | 23% shorter pot life Compared to sample 2 |

PETMA (4 thiol groups),
TMPMP (3 thiol groups),
TMPTA (3 ene groups),
TEGDA (2 ene groups).

6. Example of Impregnation of Different Types of Wood which are Both Natural and Compressed Table 6 shows results from examples of impregnation of different types of wood which are both natural and compressed.

The composition in the investigation was thiol TMPMP (Trimethylol-propane Tri-3-mercaptopropionate) and the enes TMPTMA (Trimethylolpropane Trimethacrylate) and HDDA (Hexanedioldiacrylate), the molar ratio between the enes are 8:2. The molar ratio was 1:2 between the thiol and ene groups.

Wooden pieces (2000×200×4 mm) were impregnated with the composition above. The impregnation process parameters were the following:
Vacuum pressure: 0.15 bar during 6 minutes
Normal pressure: 15 during minutes
Over pressure: 1.3 bar during 15 minutes
Vacuum pressure: 0.15 bar during 6 minutes
Normal pressure: 24 hours
Curing at 100° C., 24 hours

TABLE 6

Examples of impregnation of different types of wood which are both natural and compressed.

| Wood material | Weight % of thiolene composition in wood elements | Pressure test (1-5) | Sanding test (1-5) |
|---|---|---|---|
| Aspen | 28 | 5 | 5 |
| Birch | 43 | 5 | 5 |
| Oak | 15 | 5 | 5 |
| Beech | 37 | 5 | 5 |
| Compressed Beech | 13 | 5 | 5 |
| Compressed Alder | 30 | 5 | 5 |

Note that the scale 1 to 5 means that 1 is bad and 5 is excellent. Pressure test is a test if any liquid can be squeezed out from the wood piece. Sanding test is performed in a sanding machine with 120 paper. Beech is compressed to 65% and alder to 60% of uncompressed wood elements.

The thiolene impregnation process is according to the examples above and the tests show that it can be used for all type of woods. The wood can be both natural and compressed.

7. Example of Natural or Compressed Wood Impregnated with Coloured Thiol-Ene Composition Having Properties that are Equal or Better than Rain Forest Wood. Coloured Thiolene Composition is Obtained by Using Dyes Micronized Pigments and/or Pigments A coloured composition is obtained by using dyes, micronized pigments and/or pigments. Examples are shown below for natural or compressed wood impregnated with coloured compositions having properties that are equal or better than wood from rain forest.

The composition in the investigation was thiol TMPMP (Trimethylol-propane Tri-3-mercaptopropionate) and the enes TMPTMA (Trimethylolpropane Trimethacrylate) and TEGDA (Triethyleneglycoldiacrylate), the molar ratio between the enes are 9:1. The molar ratio was 1:2 between the thiol and ene groups. To the composition was added an orange dye and a black dye.

Compressed wooden pieces (2000×200×4 mm) were impregnated with the composition above. The impregnation process parameters were the following:
Vacuum pressure: 0.15 bar during 6 minutes
Normal pressure: 15 during minutes
Over pressure: 1.3 bar during 15 minutes
Vacuum pressure: 0.15 bar during 6 minutes
Normal pressure: during 24 hours
Curing at 100° C., 24 hours In table 7 are the results from different coloured impregnated wood shown.

TABLE 7

Coloured impregnated wood elements and compressed wood elements

| Wood | Weight % of thiolene composition in wood elements | Even Colouration from the surface to the middle of the wood element | Comments |
|---|---|---|---|
| Alder | 52 | Yes | Even colour No White spots |
| Beech | 35 | Yes | Even colour No White spot |
| Birch | 41 | Yes | Even colour No White spot |
| Compressed Beech | 23 | Yes | Even colour No White spots |
| Compressed Alder | 30 | Yes | Even colour No White spots |

8. Example of Mechanical Properties

The mechanical properties, Brinell hardness (SS-EN 1534) and Bending strength (ISO 3133), were determined for different wood elements. Hardness tests were preformed on several hard species. The results are shown in table 8 below.

TABLE 8

Brinell hardness (SS-EN 1534) and Bending strength (ISO 3133)
All values are measured average from a fixed set of samples.

| Mechanical property | before | after | before | After | before | after |
|---|---|---|---|---|---|---|
| | Beech | | Alder | | Birch | |
| Hardness (Brinell) | 3.8 | 8.6 | 2.1 | 15.2 | 2.6 | 14.9 |
| Bending strength (MPa) | 125 | 169 | 90 | 121 | 115 | 160 |
| | Compr. Beech | | Compr. Alder | | Compr. Birch | |
| Hardness (Brinell) | 7.2 | 11.7 | 4.1 | * | 4.5 | 11.9 |
| Bending strength (MPa) | 175 | 202 | 128 | * | 141 | 239 |

* measurement not performed

The results above show that both Brinell hardness and Bending strength for the different impregnated wood elements have a large increase in mechanical performance compared to the natural wood elements.

The ordinary hard wood achieves significantly increased mechanical properties with respect to hardness that has an extra-high increase (up to 600%) and bending strength that has a high increase (up to 70%). The compressed (according to the Calignum patent EP 0729401B1) impregnated wood samples achieves medium-high increase in hardness (up to 300%) and a high to extra-high increase in bending strength (up to 150%).

9. Example of Different Amount of Thiolene Composition in Wood Elements Ranging From 0 to 80% of Thiolene Composition in Wood Element The table 9 below show different amount of thiolene composition in wood elements ranging from 0 to 80% by weight. The composition in the investigation was thiol TMPMP (Trimethylol-propane Tri-3-mercaptopropionate) and the enes TMPTMA (Trimethylolpropane Trimethacrylate) and HDDA (Hexandioldiacrylate), the molar ratio between the enes are 9:1. The molar ratio was 1:2 between the thiol and ene groups.

Wooden pieces (2000×200×4 mm) were impregnated with the composition above. The impregnation process parameters were the following:
Vacuum pressure: 0.10 bar during 8 minutes
Normal pressure: 15 during minutes
Over pressure: 1.2 bar during 20 minutes
Vacuum pressure: 0.15 bar during 6 minutes
Normal pressure: during 24 hours
Curing at 100° C., 24 hours

TABLE 9

Different amount of thiolene composition in wood elements

| Weight % of thiolene composition in wood elements | Surface curing | FTIR (%) |
|---|---|---|
| 1 | Yes | 93 |
| 11 | Yes | 96 |
| 23 | Yes | 95 |
| 41 | Yes | 94 |
| 59 | Yes | 95 |
| 78 | Yes | 93 |

The results in table 9 show good curing performance for different amounts of thiolene composition in wood elements from 0 to approximately 80 weight % thiolene composition in wood elements.

10. Different Molar Ratios Between Thiol and Ene

The table 10 below show different molar ratios between thiol and ene in wood elements ranging from 1:0.1 to 1:100. The composition in the investigation was thiol TMPMP (Trimethylol-propane Tri-3-mercaptopropionate) and the ene TMPTMA (Trimethylolpropane Trimethacrylate.

Wooden pieces (2000×200×4 mm) were impregnated with the composition above. The impregnation process parameters were the following:
Vacuum pressure: 0.15 bar during 6 minutes
Normal pressure: 20 during minutes
Over pressure: 1.4 bar during 15 minutes
Vacuum pressure: 0.15 bar during 10 minutes
Normal pressure: during 10 hours
Curing at 100° C., 24 hours convection oven

TABLE 10

Different molar ratios between thiol and ene

| Molar of ratio between Thiol and ene composition in wood elements | Surface curing | FTIR (%) |
|---|---|---|
| 1:0.1 | Yes, little tacky | 91 |
| 1:1 | Yes | 95 |
| 1:5 | Yes | 97 |
| 1:20 | Yes | 94 |
| 1:50 | Yes | 91 |
| 1:100 | Yes | 88 |

The results show good curing performance for molar ratios of thiol and ene ranging from 1:0.1 to 1:100.

The invention claimed is:

1. An impregnated wood element comprising a wood element and an impregnating composition, wherein the impregnated wood element is obtained by impregnating the wood element with the composition in the form of a mixture comprising at least two components a) and b), wherein component a) comprises at least one mono and/or multifunctional thiol selected from the group consisting of mercaptopropionate esters, mercaptoacetate esters and mixtures thereof, and component b) comprises at least one mono and/or multifunctional ene chosen from the group consisting of norbornene, vinyl ether, propenyl, alkene, vinyl ester, N-vinyl amides, allyl ethers, allyltriazine, allylisocyanurate, acrylate, unsaturated esters, N-substituted meleimide, acrylonitrile, methacrylate, styrene, conjugated dienes and mixtures thereof, the molar ratio between the thiol groups and the ene groups is 1:0.1 to 1:100; and thereafter curing the composition or the mixture.

2. An impregnated wood element according to claim 1, wherein at least one of the components a) and b) comprises dyes, micronized pigments and/or pigments.

3. An impregnated wood element according to claim 1, wherein at least one of the components a) and b) may comprise additives selected from initiators, inhibitors, and other additives.

4. An impregnated wood element according to claim 1, wherein the wood element comprises from about 1 to about 80% by weight of the composition or the mixture calculated on the total weight of the impregnated wood element.

5. An impregnated wood element according to claim 1, wherein the wood element is selected from the group consisting of soft wood and hard wood.

6. An impregnated wood element according to claim 1, wherein the molar ratio between the thiol groups and the ene groups is 1:0.9 to 1:10.

* * * * *